(12) United States Patent
Colon-Bonet et al.

(10) Patent No.: US 6,381,624 B1
(45) Date of Patent: Apr. 30, 2002

(54) FASTER MULTIPLY/ACCUMULATOR

(75) Inventors: Glenn T Colon-Bonet, Ft Collins; Paul Robert Thayer, Fort Collins, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/301,830

(22) Filed: Apr. 29, 1999

(51) Int. Cl.⁷ .............................................. G06F 7/38
(52) U.S. Cl. ...................................... 708/501; 708/523
(58) Field of Search ................................. 708/490, 523, 708/495, 501, 503, 505, 603

(56) References Cited

U.S. PATENT DOCUMENTS

| | | | |
|---|---|---|---|
| 4,969,118 A | * 11/1990 | Montoye et al. | 708/501 |
| 5,241,493 A | * 8/1993 | Chu et al. | 708/501 |
| 5,751,621 A | * 5/1998 | Arakawa | 708/501 |
| 5,993,051 A | * 11/1999 | Jiang et al. | 364/748.07 |

* cited by examiner

Primary Examiner—Chuong Dinh Ngo

(57) ABSTRACT

A Multiply Accumulate unit, which may be an FMAC for IEEE 754 format numbers, finds A*B±C faster if the multiplier is allowed to assume that it's A and B inputs are always positive, so that it never has to provide a complemented output, and if the C input for the accumulation with the product is also assumed to be positive. The sign magnitude notation of the IEEE 754 format is temporarily exchanged for a positive two's complement notation of the assumed positive values. Notice is taken of the actual signs, and when there is a difference to be formed, either because of addition between numbers having opposite signs, or because of a subtraction between numbers having the same sign, one of the numbers need to be negated (complemented) prior to the addition of C and the product AB. That number can always be C, provided that correct compensatory negation is available after the addition. Such negations of C are accomplished by performing a one's complement followed by a carry-in to the subsequent adder. Each of the complemented and the non-complemented C values are readily available. Their production and the selection of one or the other are operations that overlap the execution of the multiply, and are done in a way that does not increase the path delay through the shifter. The accumulated result will typically need to be normalized, after which it may need a final complement operation to adjust its sign, in accordance with the original signs and whether the accumulation was addition or subtraction. The result may be converted back to the IEEE 754 format in due course.

6 Claims, 3 Drawing Sheets

FASTER MULTIPLY/ACCUMULATOR

BACKGROUND OF THE INVENTION

A multiply/accumulator (MAC) is a circuit that accepts three numerical input values A,B and C, and produces therefrom the arithmetic result A*B±C. Often, A, B and C are signed floating point 5 binary numbers expressed in the format described by ANSI/IEEE 754–1985, or perhaps some compatible extension thereof, in which case the circuit is a Float Point MAC, or FMAC. A modern binary FMAC is, as things go, a rather large circuit, and is usually one of the main components in an FPU (Floating Point Unit), which is itself a major functional portion of many microprocessors. An FMAC will produce A*B+C in response to the execution by its host environment (generally an FPU) 10 of an FMA instruction (Floating Point Multiply Add). There is usually also an FMS instruction (Floating Point Multiply Subtract), that produces A*B−C. We will be interested in the internal operation of an FMAC for both FMA and FMS instructions.

Another aspect of FMAC operation is also of considerable interest. It is desirable that they run as fast as possible. A slight reduction in the time required to accomplish an operation can sometimes produce in a computationally intensive process an overall savings in time that is very significant. It is common for an FMAC to incorporate parallel paths of data manipulation for different components of the input numerical values. For example, floating point numbers (for which there are several standard formats) have significands (sometimes also called mantissas) and exponents. When two floating point numbers are to be added, their significands must first be aligned if they have unequal exponents. This is sometimes called "de-normalization". So, in the case of an FMAC the significand bits of C will be shifted by an amount related to difference between its exponent and the exponent that results from multiplying A and B. That difference can be found while the multiplication is proceeding, so that the shifting of C can be completed as soon as possible, and hopefully before the completion of the multiply operation.

An FMAC must also be able to compute with signed numbers. In one conventional FMAC the significands for A, B and C are converted from the sign magnitude format of IEEE 754 to two's complement, and the multiplier itself produces a correctly signed two's complement result for use in the ensuing accumulation. The C input value is shifted as needed to produce bit alignment of the significands, but is itself never complemented. The result of the accumulation is again complemented or not, in view of the signs of the operands and whether the accumulation is addition or subtraction. It is not so much that this does not work; it does. But it increases the execution time of the multiplier if it is to provide a correctly signed (potentially complemented) output; forming and selecting such a two's complement is of necessity a separate serial step in the sequence of operations within the FMAC, having its own price expressible in gate delays. In connection with this topic it may be useful to refer to U.S. Pat. No. 5,677,863 entitled METHOD OF PERFORMING OPERAND INCREMENT IN BOOTH RECODED MULTIPLY ARRAY, issued on Oct. 14, 1997 to Samuel D. Naffziger and assigned to Hewlett-Packard Co.) It would be desirable if the expense of that extra time could be avoided. What to do?

SUMMARY OF THE INVENTION

An FMAC can be made to run faster if the multiplier is allowed to assume that it's A and B inputs are always positive, so that it never has to provide a complemented output, and if the C input for the accumulation with the product is also assumed to be positive. In connection with this, the sign magnitude notation of the IEEE 754 format of the mantissas (significands) is temporarily exchanged for two's complement notation of the assumed positive values, which is to say that they are expressed as ordinary binary numbers in a field large enough to be two's complemented, if needed. Since IEEE 754 is already binary for that part of the number, no extensive "conversion" is required. To be sure, notice is taken of the actual signs, and when there is a difference to be formed, either because of addition between numbers having opposite signs, or because of a subtraction between numbers having the same sign, one of the numbers need to be negated (complemented) prior to the addition of C and the product AB. That number can always be C, provided that correct compensatory negation is available after the addition. Such negations are accomplished by performing a two's complement. The plan is to take advantage of the ability to recognize early on that a two's complement for C is needed and select a one's complement of the (shifted) C input, instead of doing a two's complement to the product. Each of the complemented and the non-complemented (shifted) C values are readily available. Their production and the selection of one or the other are operations that overlap the execution of the multiply, and preferably are done in a way that does not increase the path delay through the shifter. Whenever the one's complement of the shifted C is selected, a carry-in is also applied to the subsequent adder that forms the accumulation, and thus completes the required two's complement operation. The accumulated result will typically need to be normalized (shifted), after which it may need a final complement operation to adjust its sign, in accordance with the original signs and whether the accumulation was addition or subtraction. The result may be converted back to the IEEE 754 format in due course.

DESCRIPTION OF A PREFERRED EMBODIMENT

Figure 1:
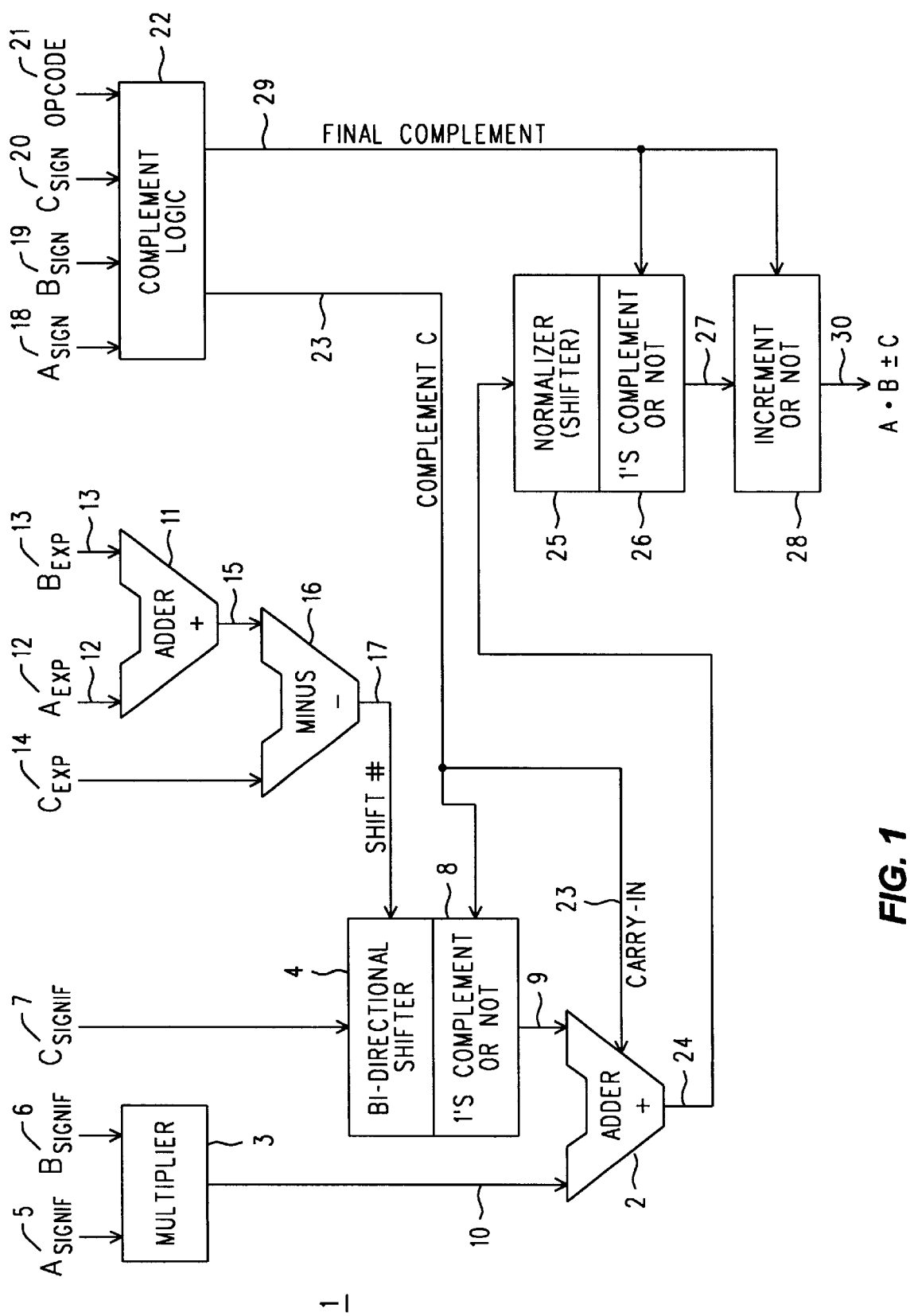
FIG. 1 is a simplified block diagram of a Floating Point Multiply Accumulate unit (FMAC) constructed in accordance with the invention, but which leaves the significand of the result in two's complement form.

Refer now to FIG. 1, wherein is shown a simplified block diagram 1 of an FMAC that operates in accordance with the principles of the invention. The inputs to the block diagram 1 are A, B and C, as discussed above. These values were originally in IEEE 754 format, but have already been separated according to known methods into individual significand, exponent and original sign portions, as identified in due course below. Preferably, the individual bits of these numbers are represented in a complementary logic form involving paired H (high) and L (low) signals, such that if a particular bit position in some value NUM, say, NUM[3], is a one, then NUM[3]H is true and NUM[3]L is false. If NUM[3] were false, then NUM[3]H would be false and NUM[3]L would be true. To continue, then, an ADDER 2 has inputs 10 and 9 that respectively originate with a MULTIPLIER 3 whose inputs are positive binary mantissa portions $A_{signif}$ 5 and $B_{signif}$ 6, and a BI-DIRECTIONAL SHIFTER4 whose input is the positive binary mantissa portion $C_{signif}$ 7. The "known method" alluded to above can be as simple as routing the bits of the significands into a right-justified position in a wider field, since the IEEE 754 format is simply sign/magnitude binary for that part of the number. Hence, there is no "conversion box" for the significands shown in the figure. The shifted result from the BI-DIRECTIONAL SHIFTER 4 can be negated by the combination of a one's complement applied by element 8 in conjunction with a carry-in (23) to the ADDER 2.

The BI-DIRECTIONAL SHIFTER 4 in a direction and by an amount that is indicated to it by a quantity SHIFT# produced by a subtraction circuit 16 whose minuend input is $C_{exp}$ 14 and whose subtrahend input is the sum of the exponents for the factors multiplies to produce the product AB: $A_{exp}$ 12 and $B_{exp}$ 13. The quantities $A_{exp}$ 12 and $B_{exp}$ 13 are added by an ADDER 11 whose output 15 is applied as the subtrahend input to the subtraction circuit 16. IEEE 754incorporates an offset in a two's complement representation of the exponents. We have omitted as uninteresting the well known and conventional details of doing arithmetic on such exponents. In general, either $A_{exp}$ 12, $B_{exp}$ 13 and $C_{exp}$ 14 have been previously converted to a suitable binary format (the offset removed), or the adder 11 and subtraction circuit 16 have been adapted to cope with the offsets.

Meanwhile, an OPCODE 21 indicative of the operation to be performed (FMA, FMS, . . . ) and the original sign information $A_{sign}$ 18, $B_{sign}$ 19 and $C_{sign}$ 20 are applied to a COMPLEMENT LOGIC circuit 22 whose task it is to control (with COMPLEMENT C / CARRY-IN 23) whether to complement the output of the BI-DIRECTIONAL SHIFTER 4 and (with FINAL COMPLEMENT 29) whether to apply a final complement to the normalization of the result 24 of the accumulation produced by ADDER 2. The rules for making these decisions are discussed further on below.

To continue, then, the accumulation result 24 from ADDER 2 is applied to a NORMALIZER 25 (which is a known circuit that is essentially a shifter). The NORMALIZER 25 might be of the sort that shifts until it determines on its own that the most significant bit is non-zero, or, it might be of the sort that receives its shift information from a Leading Bit Anticipator. See, for example, U.S. Pat. No. 5,798,952 issued on Aug. 25, 1998 to Robert H. Miller entitled IMPROVED LEADING BIT ANTICIPATOR and assigned to Hewlett-Packard Co. In any event, the resultant output from the NORMALIZER 25 is coupled to a one's complement circuit 26 that will complement or not according to the signal FINAL COMPLEMENT 29. The output 27 of the complementor circuit 26 is applied to an increment circuit 28 that will increment that value or not, also according to the signal FINAL COMPLEMENT 29, thus providing a two's complement (negation) or not in a result 30, as indicated by the signal FINAL COMPLEMENT 29. As shown below, that result 30 is the desired quantity: A*B±C.

The function of the COMPLEMENT LOGIC circuit 22 may be appreciated from an understanding of the following tables I and II (remember, effective operands are positive, so that the signs shown are for original inputs):

TABLE I (FMA)

| A*B > 0 | A*B < 0 | |
|---|---|---|
| No Comp. C & No Final Comp. | Comp. C & Final Comp. | C > 0 |
| Comp. C & No Final Comp. | No Comp. C & Final Comp. | C < 0 |

TABLE II (FMS)

| A*B > 0 | A*B < 0 | |
|---|---|---|
| Comp. C & No Final Comp. | No Comp. C & Final Comp. | C > 0 |
| No Comp. C & No Final Comp. | Comp. C & Final Comp. | C < 0 |

Consider a few examples. If each of A, B and C is positive, then for the FMA instruction we obtain the straightforward case of (A*B)+C. The same inputs for the FMS instruction get a Comp. C(COMPLEMENT C 23), which causes accumulator 2 to. subtract (by adding the negation of)a positive C from the product to produce (A*B)–C. If each of A, B and C is negative, then the result for FMA is some positive number AB added to the negation of C, or (A*B)–C. For FMS with the same inputs the subtraction of a C less than zero is the same as adding the positive value, which is done by the absence of complementing, as shown in the lower left cell of Table II. Now suppose that A and B have different signs; then for both FMA and FMS we get a negative product by performing a FINAL COMPLEMENT 29. To add a positive C (FMA) we complement it ahead of time (upper right cell of Table I) so that the final complement will essentially multiply the result (–A*B+C) by minus one and change the sign of C, as well as that of A*B, to produce (–A*B+C). For FMS and those same conditions we simply do not complement C ahead of time, producing (–A*B+C).

It will readily be appreciated that there are several well known techniques that may be used to produce the signals COMPLEMENT C 23 and FINAL COMLEMENT 29 from the signal OPCODE 21 (indicative of the operation to be performed: FMA, FMS, . . . ) and the original sign information $A_{sign}$ 18, $B_{sign}$ 19 and $C_{sign}$ 20, all in accordance with the relationships set out in Tables I and II. These include, but are not limited to, the outputs of dedicated logic gating and signals generated by state machines.

Figure 2:
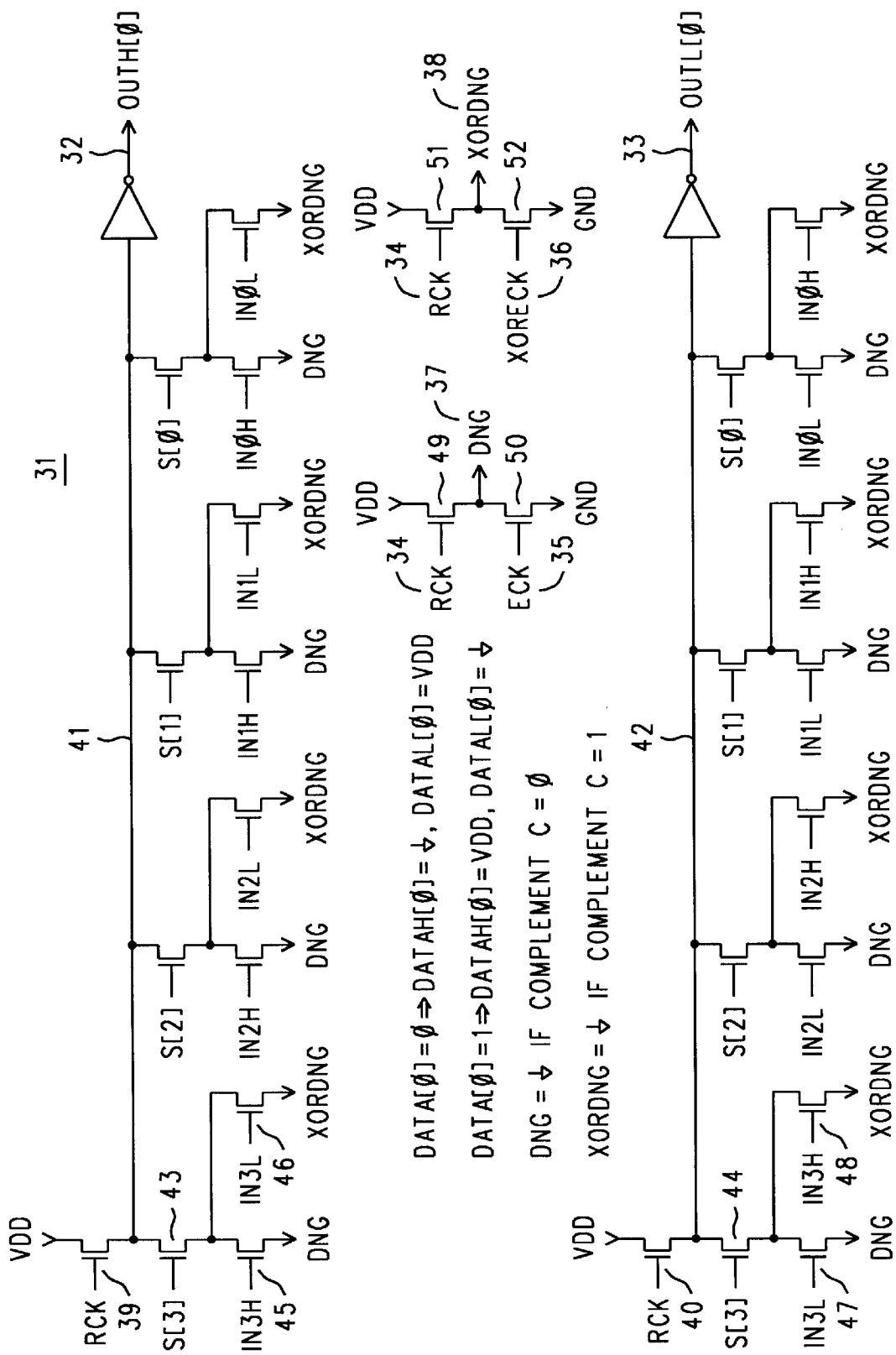
FIG. 2 is a simplified schematic diagram of a one's complement or not portion of a shifter incorporated in the FMAC of the block diagram of FIG. 1.

Refer now to FIG. 2, wherein is shown a schematic segment 31 of the 1's COMPLEMENT OR NOT 8 portion of the BI-DIRECTIONAL SHIFTER 4. Although the schematic segment 31 deals with the production of just one final bit zero (denoted by the suffix [0]) from four possible source positions S[3]–S[0],it is representative of sixty-three other segments (not shown in the interests of brevity). Also not shown is the production of the four possible source position signals, where at signals are shifted in steps of four bit positions, nor a level above that where the unit of shifting is sixteen positions. The overall architecture of such a shifter is well known in the art, and need not be repeated here. The segment 31 may be characterized as a final stage for "fine"

positioning (referring to the shifting of data values from one bit position to another) that follows a mid-level shifting stage that itself follows a "coarse" shifting stage. Segment 31 thus produces one bit in the [0] position: OUTH[0] 32 and OUTL[0] 33. OUTH and OUTL are logically complementary: if one is high (at VDD) then the other is low (at GND).

Signals RCK 34, ECK 35 and XORECK 36 are clocks. RCK 34 and ECK 35 are applied to series transistors 49 and 50, respectively, to produce the signal DNG 37 (which is GND—ground—spelled backwards). Signals RCK 34 and XORECK 36 are applied to series transistors 51 and 52, respectively, to produce the signal XORDNG 38. The production of the clocks is arranged so that DNG 37 is at GND if the signal COMPLEMENT C 23 is false (0), and XORDNG 38 is at GND if COMPLEMENT C 23 is true.

Signal S[3] is applied to transistors 43 and 44, which are respectively in series with parallel pairs of transistors 45/46 and 47/48. S[3] represents a fine position selection of a bit that is to be shifted into OUTH[0] 32 and OUTL[0]; S[2] through S[0] represent the other possible fine postions that might occur, and they are each associated with other transistors that are in turn in series with parallel pairs. The signals IN3H and IN3L represent (as a complement pair) the data value that has been shifted to S[3] by the earlier stages. Only one of S[3] through S[0] will be true at one time. Assume it is S[3]. If a non-complemented output is desired, then DNG will be at ground while XORDNG is not. The presence of S[3] will turn on transistors 43 and 44; the other series transistors connected to S[2] through S[0] will be off. The data value signal IN3H will be inverted by transistor 45, while transistor 47 inverts IN3L, pulling lines 41 and 42 low after their having been pre-charged by the action of RCK. Lines 41 and 42 are each inverted by inverters 32 and 33, respectively, so that IN3H appears as OUTH[0] and IN3L appears as OUTL[0].

To obtain the complemented output the role of DNG and XORDNG is reversed, so that transistors 46 and 48 are on, with transistors 45 and 47 now off. This reverses the logical sense of the value of IN3 by interchanging which of IN3H and IN3L are applied to lines 41 and 42, resulting in a one s complemented output.

It is important to appreciate that the one's complement mechanism 8 incorporated in the shifter 4 does not add delay to the operation of the shifter. To see this, note that a conventional shifter after what is shown in FIG. 2 would be one that has no "complement or not" capability. It would be missing transistors 46 and 48, as well as the similar six other transistors connected to XORDNG. Transistors 45 and 47, and the six others connected to DNG would remain, as part of the selection mechanism for non-complemented outputs. Now, when considering which of, say, transistors 45 or 46 is to be used to respond to IN3, neither has any longer delay than the other, and at least one of them has to be there, anyway, as part of the shift amount selection mechanism. It will be appreciated, then, that the one's complement occurs by using a complement value (IN3L for IN3H, or vice versa) that is present anyway owing to the dual nature of the logical representation of signals (the H/L scheme). So long as the decision as to which path to take to GND (DNG versus XORDNG) is made before the final stage of shifting is actually passing its bits, there is no extra delay associated with complementing the output of the shifter.

In final connection with FIG. 2, it will be appreciated that the 1'S COMPLEMENT OR NOT portion 26 of NORMALIZER 25 could be constructed after the fashion of the 1'S COMPLEMENT OR NOT portion 8 of BI-DIRECTIONAL SHIFTER 4.

To return briefly to FIG. 1, it will be appreciated that our description of that figure involves a resulting significand 30 which is correctly signed, but which is also in two's complement form. This may be convenient if the larger system encompassing the FMAC 1 has more arithmetic or other processing to do with that result before converting the ultimate result back to IEEE 754. Alternatively, it might be the case that the result is going to be left in two's complement form. Perhaps the input arguments were not in IEEE 754 in the beginning, anyway, with the three input significands A 5, B 6 and C 7 having been arranged to appear in the format that was stated in connection with the description of FIG. 1.

The situation is slightly different if the resulting significand at the output of INCREMENT OR NOT circuit 28 is, without further activity, to be converted to IEEE 754 (where the significand is in a sign magnitude format). The situation is this. Suppose the result 24 from ADDER 2 is negative. The bits of that result 24 are going to have be the origin of a significand expressed in sign magnitude form (whose significands are expressed in "ordinary", or non-complement, binary form). To do that they are going to need to be complemented, and the need to do this arises simply because result 24 came out negative. However, the overall result is still negative so something has to set to "negative" the sign bit that goes with the sign magnitude number being formed. The result 30 could be converted by a process immediately downstream. But then we run the risk of having just complemented a result, only to need to complement it back with the process that converts to IEEE 754. It would be most desirable to prevent such a waste of time by avoiding un-needed complements. How this may be done is the subject of FIG. 3.

Figure 3:
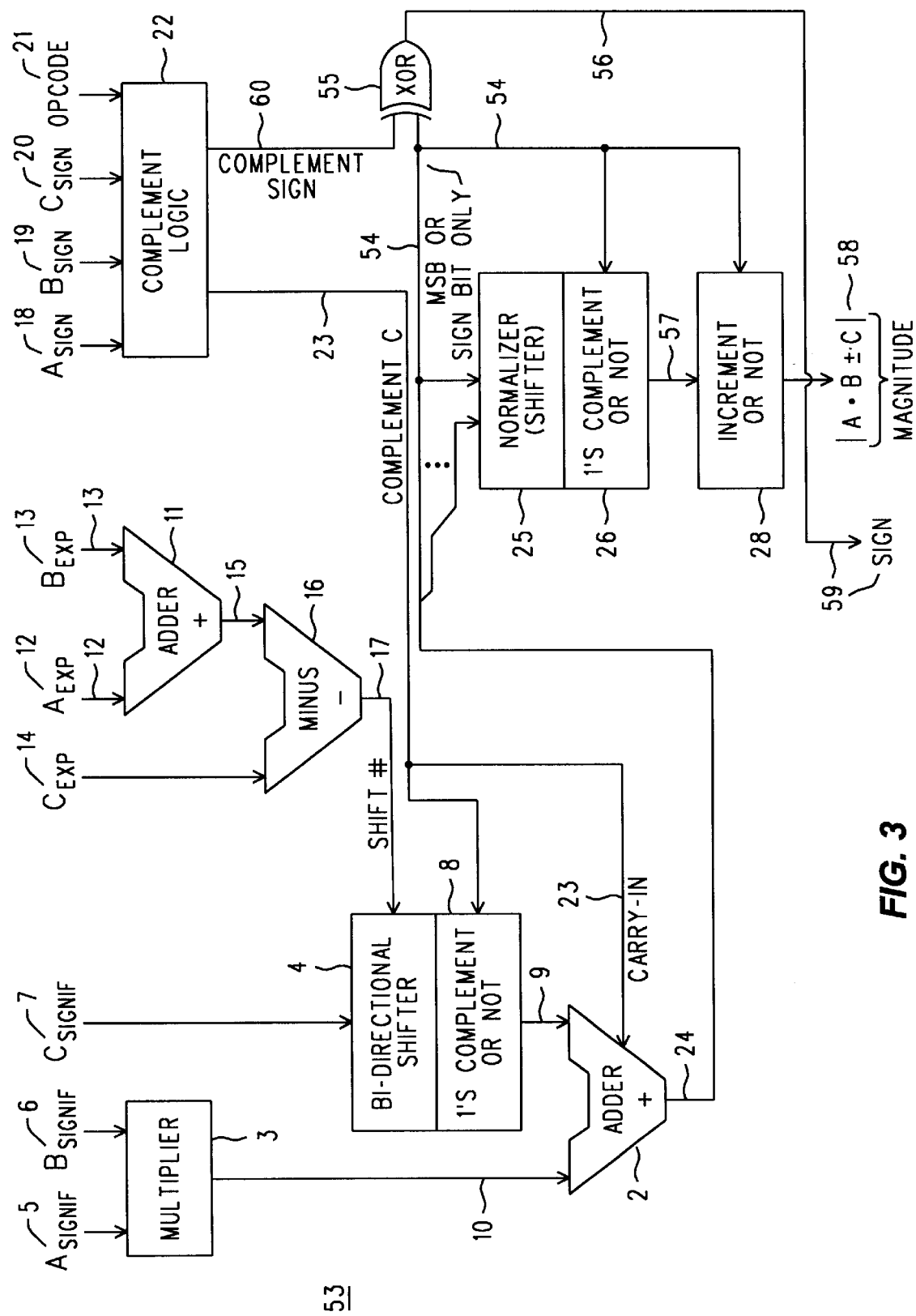
FIG. 3 is a simplified block diagram similar to FIG. 1, but which has been altered to facilitate the conversion of the significand of the result to sign magnitude form.

Refer now to FIG. 3, in which elements that may be actually or essentially identical with the corresponding elements of FIG. 1 have the same reference characters. The signals FINAL COMPLEMENT 29 in FIG. 1 and COMPLEMENT SIGN 60 in FIG. 3 are similar in that they are generated in the same ways according to Tables I and II. They have different names because they are put to different uses, as explained below. The key to appreciating the situation is to recognize that the cells in Tables I and II which call for a "Final Comp." do so in order to negate the RESULT 24, as in multiplication by minus one. That is, the sign of the RESULT 24 needs to be complemented. Recall that an XOR gate can be used to complement the value a of a bit applied to one input in response to a complement signal applied to the other.

In the block diagram 53 of FIG. 3 the MSB or sign bit 54 of result 24 is obtained and sent as one input to an XOR gate 55. The other input to XOR gate 55 is the signal COMPLEMENT SIGN 60. The output 56 of XOR gate 55 is the complement of sign bit 54 when COMPLEMENT SIGN 60 is true. The signal 56 is taken as the sign 59 of a sign magnitude result, whose magnitude will be the absolute value $|A*B\pm C|$ 58. So, in cases where result 24 is negative it will be so indicated as sign 59 when COMPLEMENT SIGN 60 is false, while also producing a TRUE value for signal 54 and provoking a two's complement to produce a positive result 58. In cases where result 24 is positive and COMPLEMENT SIGN 60 is false, signal 56 remains false and sign 59 is thus positive, and no complementing occurs. In cases where COMPLEMENT SIGN 60 is true, then sign bit 54 is indeed complemented so that sign 59 represents the desired negation, but the significand bits are only complemented by circuits 26 and 28 when the result 24 was indeed negative. Thus, sign bit 59 and absolute value 58 may be taken as the sign magnitude form of result 30 of FIG. 1.

Finally, it will be appreciated that the principles embodied in the circuitry shown in FIGS. 1 and 3, and of Tables I and II, do not require the use of floating point inputs. The notions of construing the product A*B and the C input as positive, while complementing the C input with a subsequent negation in view of whether the accumulation is addition or subtraction, may be practiced with fixed point inputs. In such a case there would be no need for shifters 4 and 25, nor for the accumulation circuitry 11 and 16.

We claim:

1. A computer comprising a computer readable medium, said computer readable medium comprising instructions for of producing the accumulation of a product A*B of signed numbers A and B with a signed number C to produce A*B+C by:
   (a) determining the signs of input numbers A, B and C;
   (b) subsequent to the step (a), construing the input numbers A, B and C as positive two's complement numbers;
   (c) forming a two's complement positive product A*B of the construed as positive numbers A and B;
   (d) performing a one's complement on the construed as positive number C if the accumulation is addition and either the determined signs for A and B are the same with the determined sign for C being negative or the determined signs for A and B are different with the determined sign for C being positive;
   (e) performing a one's complement on the construed as positive number C if the accumulation is subtraction and either the determined signs for A and B are the same with the determined signs for C being positive or the determined signs for A and B are different with the determined sign for C being negative;
   (f) subsequent to steps (d) and (e), calculating the fixed point sum of the positive product A*B and the conditionally complemented number C;
   (g) conditionally incrementing the fixed point sum by one if the construed as positive number C was one's complemented in one of steps (d) and (e), thereby completing a two's complement and negation of the input number C;
   (h) performing a two's complement on the result of step (g) if the determined signs for A and B are different.

2. A computer comprising a computer readable medium, said computer readable medium comprising instructions for producing the accumulation of a product A*B of signed numbers A and B with a signed number C to produce A*B+C by:
   (a) determining the signs of input numbers A, B and C;
   (b) subsequent to the step (a), construing the input numbers A, B and C as positive two's complement numbers;
   (c) forming a two's complement positive product A*B of the construed as positive numbers A and B;
   (d) performing a one's complement on the construed as positive number C if the accumulation is addition and either the determined signs of A and B are the same with the determined sign for C being negative or the determined signs for A and B are different with the determined sign for C being positive;
   (e) performing a one's complement on the construed as positive number C if the accumulation is subtraction and either the determined signs for A and B are the same with the determined sign for C being positive or the determined signs for A and B are different with the determined sign for C being negative;
   (f) subsequent to steps (d) and (e), calculating the fixed point sum of the positive product A*B and the conditionally complemented number C;
   (g) conditionally incrementing the fixed point sum by one if the construed as positive number C was one's complemented in one of steps (d) and (e), thereby completing a two's complement and negation of the input number C;
   (h) performing a two's complement on the result of step (g) if the result of step (f) is negative, thereby producing a positive result magnitude portion;
   (i) generating a result sign portion wherein the value of the result sign portion is the complement of the sign of the result of step (f) when the determined signs for A and B are different and that is otherwise the same as the sign of the result of the step (f); and
   (j) associating the result sign portion with the result magnitude portion.

3. A computer comprising a computer readable medium, said computer readable medium comprising instructions for producing floating point accumulation of a product A*B of signed floating point numbers A and B with a signed floating point number C to produce A*B+C by:
   (a) determining the signs of the floating point numbers A, B and C;
   (b) construing the significand portion of A, B and C as positive two's complement numbers;
   (c) forming a positive product A*B of the construed as positive siginificand portions of the floating point numbers A and B;
   (d) shifting the construed as positive C significand by an amount and in a direction determined by the difference between the exponent value of the C floating point number and the sum of the exponent values for the A and B floating point numbers;
   (e) performing a one's complement on the shifted C significand if the accumulation is addition and either the determined signs for A and B are the same with the determined sign for C being negative or the determined signs for A and B are different with the determined sign for C being positive;
   (f) performing a one's complement on the shifted C significand if the accumulation is subtraction and either the determined signs for A and B are the same with the determined sign for C being positive or the determined signs for A and B are different with the determined sign for C being negative;
   (g) calculating the fixed point sum of the positive product A*B and the conditionally complemented shifted C significand;
   (h) conditionally incrementing the fixed point sum by one if the shifted C significand was one's complemented, thereby completing a two's complement and negation of the shifted C significand;
   (i) normalizing the conditionally incremented sum to produce a normalized result;
   (j) performing a one's complement on the normalized result if the determined signs for A and B are different, to produce a conditionally complemented normalized result; and
   (k) incrementing the conditionally complemented normalized result if it was complemented in step (j), thereby completing a two's complement and negation of the normalized result.

4. A computer comprising a computer readable medium, said computer readable medium comprising instructions for producing the floating point accumulation of a product A*B of signed floating point numbers A and B with a signed floating point number C to produce A*B+C by:

(a) determining the signs of floating point numbers A, B and C;

(b) construing the significand portions of A, B and C as positive two's complement numbers;

(c) forming a positive product A*B of the construed as positive significand portions of the floating point numbers A and B;

(d) shifting the construed as positive C significand by an amount and in a direction determined by the difference between the exponent value for the A and B floating point numbers;

(e) performing a one's complement on the shifted C significand if the accumulation is addition and either the determined signs for A and B are the same with the determined sign for C being negative or the determined signs for A and B are different with the determined sign for C begin positive;

(f) performing a one's complement on the shifted C significand if the accumulation is subtraction and either the determined signs for A and B are the same with the determined sign for C being positive or the determined signs for A and B are different with the determined sign for C being negative;

(g) calculating the fixed point sum of the positive product A*B and the conditionally complemented shifted C significand;

(h) conditionally incrementing the fixed point sum by one if the shifted C significand was one's complemented, thereby completing a two's complement and negation of the shifted C significand;

(i) normalizing the conditionally incremented sum to produce a normalized result;

(j) preforming a one's complement on the normalized result if the result of step (g) is negative, to produce a conditionally complemented normalized result;

(k) incrementing the conditionally complemented normalized result if it was complemented in step (j), thereby producing a positive magnitude portion;

(l) generating a result sign portion wherein the value of the result sign portion is the complement of the sign of the result of step (g) when the determined signs for A and B are different and that is otherwise the same as the sign of the result of step (g); and (m) associating the result sign portion with the result magnitude portion.

5. A circuit for producing the floating point accumulation of a product A*B of signed floating point numbers A and B with a signed floating point number C to produce A*B±C, the circuit comprising:

a multiplier having A and B inputs coupled to receive positive two's complement significand portions respectively corresponding to the signed floating point numbers A and B and having an output at which appears the product A*B expressed as a positive two's complement number;

a difference finding circuit having inputs coupled to the exponent portions of the signed floating point numbers A, B and C, and having an output indicative of the difference between the value of the exponent for the floating point number C and the sum of the exponents for the floating point numbers A and B;

a logic circuit having inputs coupled to signs of the signed floating point numbers A, B and C, and to a signal indicating if the floating point accumulation is to be addition or subtraction, and having output logic signals COMP C and FINAL COMP produced in accordance with the relations that:

(a) COMP C is true if the accumulation is addition and either (I) the signs for the floating point numbers A and B are the same with the sign for the floating point number C being negative, or (ii), the signs for the floating point numbers A and B are different with the sign for the floating point number C being positive;

(b) COMP C is true if the accumulation is subtraction and either (I) the signs for the floating point numbers A and B are the same with the sign for the floating point number C being positive, or (ii), the signs for the floating point numbers A and B are different with the sign for the floating point number C being negative; and (c) FINAL COMP is true if the signs for the floating point numbers A and B are different;

a bi-directional shifter having a C significand input coupled to receive a positive two's complement significand portion corresponding to the signed floating point number C, a COMPLEMENT C input coupled to the logic signal COMP C, and also having a shift amount input coupled to the output of the difference finding circuit, the bi-directional shifter producing at an output a bit pattern that represents the C significand input after having been shifted by an amount and in a direction determined by the output of the difference finding circuit and that is an un-complemented output when COMP C is not false and that is a one's complement of the un-complemented output when COMP C is true;

an adder having an input coupled to the output of the multiplier and another input to the output of the bi-directional shifter, and a carry-in input coupled to the logic signal COMP C, the adder having an output;

a normalizer having an input coupled to the output of the adder and having a FINAL COMPLEMENT input coupled to the logic signal FINAL COMP, the normalizer producing at an output a normalized and un-complemented output value when FINAL COMP is false and a normalized and one's complemented output when FINAL COMP is true; and an increment circuit having an input coupled to the output of the normalizer and an increment input coupled to the logic signal FINAL COMP, and having an output at which appears the un-incremented output of the normalizer when FINAL COMP is false and at which appears the incremented output of the normalizer when FINAL COMP is true.

6. A circuit for producing the floating point accumulation of a product A*B of signed floating point numbers A and B with a signed floating point number C to produce A*B±C, the circuit comprising:

a multiplier having A and B inputs coupled to receive positive two's complement significand portions respectively corresponding to the signed floating point numbers A and B and having an output at which appears the product A*B expressed as a positive two's complement number;

a difference finding circuit having inputs coupled to the exponent portions of the signed floating point numbers A, B and C, and having an output indicative of the difference between the value of the exponent for the floating point number C and the sum of the exponents for the floating point numbers A and B;

a logic circuit having inputs coupled to signs of the signed floating point numbers A, B and C, and to a signal indicating if the floating point accumulation is to be addition or subtraction, and having output logic signals COMP C and COMP SIGN produced in accordance with the relations that:
  (a) COMP C is true if the accumulation is addition and either (I) the signs for the floating point numbers A and B are the same with the sign for the floating point number C being negative, or (ii), the signs for the floating point numbers A and B are different with the sign for the floating point number C being positive;
  (b) COMP C is true if the accumulation is subtraction and either (I) the signs for the floating point numbers A and B are the same with the sign for the floating point number C being positive, or (ii), the signs for the floating point numbers A and B are different with the sign for the floating point number C being negative; and
  (c) COMP SIGN is true if the signs for the floating point numbers A and B are different;

a bidirectional shifter having a C significand input coupled to receive a positive two's complement significand portion corresponding to the signed floating point number C, a COMPLEMENT C input coupled to the logic signal COMP C, and also having a shift amount input coupled to the output of the difference finding circuit, the bi-directional shifter producing at an output a bit pattern that represents the C significand input after having been shifted by an amount and in a direction determined by the output of the difference finding circuit and that is an un-complemented output when COMP C is not false and that is a one's complement of the un-complemented output when COMP C is true;

an adder having an input coupled to the output of the multiplier and another input to the output of the bi-directional shifter, and a carry-in input coupled to the logic signal COMP C, the adder having an output that includes a sign bit;

a normalizer having an input coupled to the output of the adder and having a FINAL COMPLEMENT input coupled to the output sign bit of the adder, the normalizer producing at an output a normalized and un-complemented output value when the output sign bit of the adder is false and a normalized and one's complemented output when the output sign bit of the adder is true;

an increment circuit having an input coupled to the output of the normalizer and an increment input coupled to the output sign bit of the adder, and having an output at which appears the un-incremented output of the normalizer when output sign bit of the adder is false and at which appears the incremented output of the normalizer when the output sign bit of the adder is true; and an exclusive OR circuit having inputs coupled to the output sign bit of the adder and to COMP SIGN, and having an output used as the sign in a sign magnitude numerical representation having the output of the increment circuit as the magnitude.

* * * * *